United States Patent [19]
Pelton

[11] 3,977,974
[45] Aug. 31, 1976

[54] SUSPENDED SLUDGE SCRAPER FOR ARCUATE SEDIMENTATION ZONE

[75] Inventor: John Franklin Pelton, Yorktown Heights, N.Y.

[73] Assignee: Union Carbide Corporation, New York, N.Y.

[22] Filed: Oct. 6, 1975

[21] Appl. No.: 620,037

[52] U.S. Cl. .............................. 210/195 S; 210/197; 210/202; 210/218; 210/530
[51] Int. Cl.² .......................................... C02C 1/08
[58] Field of Search ........................... 210/4–7, 210/14, 15, 63, 195 M, 197, 202, 218, 219, 220, 221 R, 523, 527–530

[56] References Cited
UNITED STATES PATENTS

| | | | |
|---|---|---|---|
| 1,879,135 | 9/1932 | Downes et al. .................. | 210/528 X |
| 1,892,648 | 12/1932 | Bousman ........................ | 210/527 X |
| 2,734,634 | 2/1956 | Knowles.......................... | 210/527 X |
| 3,235,083 | 2/1966 | Sontheimer et al............. | 210/527 X |
| 3,312,346 | 4/1967 | Walker............................ | 210/195 M |
| 3,890,231 | 6/1975 | LaClair et al. ................... | 210/205 X |
| R27,000 | 12/1970 | Klopper .......................... | 210/528 X |

*Primary Examiner*—Charles N. Hart
*Assistant Examiner*—Robert H. Spitzer
*Attorney, Agent, or Firm*—John C. LeFever

[57] ABSTRACT

Apparatus for collection and removal of settled solids from the bottom part of an arcuate sedimentation zone, comprising a scraper blade suspended by cable means from a bridge and drawn reciprocatingly and repetitively in an arcuate path around the sedimentation zone. Means are provided for shortening the suspended lengths of the cable means at the approach of the bridge to a radial end wall of the zone so that the scraper blade is drawn toward the wall for radial alignment therewith, thereby eliminating unscraped 'dead space' adjacent the end walls.

16 Claims, 8 Drawing Figures

SUSPENDED SLUDGE SCRAPER FOR ARCUATE SEDIMENTATION ZONE

BACKGROUND OF THE INVENTION

This invention relates generally to apparatus for treating liquids wherein a liquid-solid is separated in an arcuate sedimentation zone and more specifically to an improved means for collecting and removing settled solids from such a zone.

In the treatment of small flow of liquids such as sewage and other wastewater streams, the prior art has commonly employed integral circular plants, i.e. plants in which all components are enclosed in a single outer wall. Such configuration possess numerous fabricational advantages; for example, the cost of material and fabrication are lower for a relatively small integral treatment plant than for a plant comprising physically separate elements. Moreover, integral plants are compact and require a small land area for installation; such a plant also has a potential for much more simplified overall design as compared to a non-integrated facility. By providing a minimum perimeter to cross sectional area ratio, circular design tends to minimize material requirements for fabrication of the integral plant while promoting a highly efficient component arrangement. Additionally, construction costs may be less in some instances for circular geometries than for other shapes, as for example in concrete fabrication.

The prior art has employed biological treatment processes in small circular plants, primarily because of their applicability to a wide variety of wastewaters and effluent requirements and comparatively low capital cost. A particularly efficient integral circular plant for activated sludge treatment of wastewater by aeration with at least 50% oxygen gas is disclosed in U.S. Pat. No. 3,890,231, issued June 17, 1975 to L. M. LaClair et al. In this apparatus, an inner circular wall is provided, concentric with the outer circular wall, to provide an inner treatment volume and in intermediate volume between the inner and outer walls. At least two separate oxygen aeration zones are provided in the plant, together with an arcuate clarification zone in the intermediate volume, bounded by radial partitions and segments of the concentric inner and outer walls serving to define arc lengths of between 90° and 330°. In operation, the oxygenated liquor from the final aeration zone is directed to means for uniformly distributing the same in the arcuate sedimentation zone around the inner wall segment thereof, and the oxygenated liquor flows radially outward from the inner wall to the outer wall. In this manner, the sedimentation path, i.e., the liquor flow path length required for sedimentation, is contained within the actual provided radial flow path, because of the beneficial radial expansion of liquid in the clarifier.

The provision of an arcuate clarification zone in the above-described apparatus has been shown to provide unique advantages for the integral wastewater treatment plant relative to the designs of the prior art. Because the arcuate clarification zone occupies only part of the intermediate volume of the plant, the remaining peripheral portion of the plant may be employed for other purposes, as for example, aeration, digestion of activated sludge, and chlorination of the clarifier effluent. Such provision thus imparts a flexibility to the arcuate clarification zone integral circular plant which is not achieved in plants having a fully extended peripheral clarifier or a central circular clarification zone.

Despite the foregoing advantages of the arcuate clarifier integral circular plant, certain disadvantages have become apparent as the system has been in use, relating to the means heretofore employed for collection and removal of settled solids from the bottom part of the arcuate clarification zone. These means generally comprise a series of sludge pick-up heads transversely spaced across the arcuate clarifier and positioned near the floor thereof. The pick-up heads are respectively supported by hollow shafts for flow therethrough to an overhead sludge trough and an air lift blower is joined through connecting lines to the lower ends of each of the respective shafts. This pick-up assembly is mounted on a motorized radially extending bridge which is continuously and repetitively moved around the clarifier along an arcuate path to provide continuous removal of settled sludge from the floor of the clarifier.

While the foregoing sludge collection and removal device is generally satisfactory in operation involving the treatment of liquids wherein the liquid-solid to be separated in the arcuate clarification zone comprises a relatively fine dispersion of suspended solids, the device is particularly susceptible to clogging and plugging of the solids conveying passages when large sized solids and extraneous solid matter are present in the liquid-solid introduced to the clarification zone. For example, in the treatment of municipal sewage, it is frequently desirable to operate the wastewater treatment system without a primary sedimentation step in order to minimize capital equipment and operating costs which would otherwise be associated with primary sedimentation apparatus. In this case, the heavy material such as garbage and stringy material such as rags which is present in the influent to the integral circular plant passes through the pre-treatment and aeration steps and is introduced to the sedimentation zone where it occludes the sludge pickup heads and transfer conduits. Such occurrence renders the integral circular plant inoperative, requiring costly shutdown and cleaning of the solids collection and removal device before treatment can be resumed.

Another problem associated with the aforedescribed solids collection and removal device in the arcuate clarifier is that the radial bridge and associated pickup head assembly, being structurally characterized by some significant dimensional width with an essentially rectangular geometry, is not able to fully traverse the non-rectangular areas adjacent the radial partition and walls of the arcuate zone. This results in the formation of "dead space" in such areas and the occurrence of solids accumulation which significantly reduces the overall efficiency of the integral plant. The provision of a design of the solids collection and removal device to overcome such problems would involve major and extensive structural alteration of the basic apparatus configuration which would significantly increase the cost and complexity of the assembly. Furthermore, it is not generally desirable to provide non-radial partition end walls in the arcuate clarification zone such as would yield near-rectangular areas at the end walls which would accommodate the sludge collection and removal device. This is because the end walls also form the bounding walls of the treatment zones adjacent to the clarification zone in the intermediate volume such as aeration or mixing zones. These zones require a geometry free from sharp corners or regions inaccessible to the liquid flow which would cause stagnant areas and short-circuiting and thus require radial partition bounding walls.

A still further problem encountered with the afore-described sludge collection and removal assembly is that when the feed liquid-solid is introduced in the clarification zone at the inner wall segment and flowed radially outwardly to the outer wall segment, such as is highly beneficial in achieving good sedimentation efficiency, a settled sludge gradient exists between the inner and outer wall segments of the clarification zone. Such variation in solids deposition requires the addition of control means to the solids collection and removal device to provide corresponding variation in volumetric flow rates of sludge withdrawal for the multiple pickup heads positioned between the inner and outer wall segments and thereby assure a suitably high solids concentration in the withdrawn sludge. Nonetheless, the additional control means again increase both the cost and complexity of the overall device.

In contrast to the problems encountered with sludge collection and removal in the arcuate clarification zone, the prior art has been able to employ comparatively simple and less costly devices for sludge collection and removal in non-arcuate rectangular and circular clarifiers and sedimentation basins. For example, it has been found particularly advantageous in these non-arcuate configurations to employ scraping devices featuring scraper blades which traverse the bottom of the sedimentation basin and move the settled solids to a localized sump or trough means from which the collected solids are withdrawn.

Prior art solids collection and removal devices utilizing scraper blades can be typified by two basic designs — those in which a scraper blade is supported by a reciprocating bridge which moves along a longitudinal, e.g., rectangular, tank and those in which the bridge moves continually along an orbital path about the axis of a circular tank or around a central circular dividing wall around a fully extended peripheral sedimentation zone.

Those devices designed for reciprocation motion in a longitudinal basin cannot generally be applied to an arcuate sedimentation zone without the formation of the aforedescribed dead space adjacent the end walls of the zone. Such devices are characteristically constructed with the scraper blade rigidly joined to an overlying bridge assembly as by means of vertically extending beam or spar members and arranged to direct settled solids to a central location such as a solids trough comprising a central alley of the longitudinal basin. In these designs the scraper blade is typically disposed at an angle with respect to the transversely extending bridge so as to effectively direct settled solids into the solids collection trough. In application to an arcuate sedimentation zone, such designs result in the existence of large unscraped areas in the end wall regions of the zone, with the aforedescribed deleterious consequences. It has been proposed by the prior art to overcome such difficulty in the arcuate sedimentation zone by positioning of transversely extending solids collection troughs adjacent the end walls of the zone. However, this expedient is not suitable in practice inasmuch as the circumferential length of the sedimentation zone over which the scraper must operate is very long and in consequence fine sludges tend to be undesirably stirred up and to re-enter suspension during the long traverse of the scraper blade between the end wall regions, thereby lowering solids collection and removal efficiency for the system. In addition, operation in this manner may place heavy mechanical load on the bridge/scraper assembly which is most desirably avoided in practice to achieve a simple and inexpensive structural configuration.

On the other hand, the devices utilizing scraper blades which have heretofore been employed in circular tanks and in fully extended, i.e. 360°, peripheral sedimentation zones are characteristically designed for uni-directional rotation. In these devices the scraper blades are rigidly connected to the overlying bridge or supporting boom and cannot accommodate solids removal in the reverse direction. Thus, such devices are fundamentally inapplicable to an arcuate configuration sedimentation zone bounded by end wall partitions, in which the solids collection and removal function is most desirably carried out by a device which moves continuously and reciprocatingly across the arcuate zone between the end wall partitions and is active in removing solids from the zone in both directions of movement.

Accordingly, it is an object of the present invention to provide an improved means for collection and removal of settled solids from the bottom part of an arcuate sedimentation zone which overcomes the aforementioned difficulties.

It is another object of the present invention to provide an improved means of the above type featuring a scraper blade which is mechanically simple and inexpensive to fabricate.

Other objects and advantages of the present invention will be apparent from the ensuing disclosure and appended claims.

SUMMARY OF THE INVENTION

This invention relates to an improved means for collecting and removing settled solids in an apparatus for treating liquids wherein a liquid-solid is separated in an arcuate sedimentation zone.

Briefly, the invention relates to a liquid treatment apparatus comprising a circular tank outer wall, with a circular inner wall concentric with the outer wall forming an intermediate volume between the inner and outer walls. A first radial partition extends across the intermediate volume between and joined at opposite edges to the inner and outer walls and a second radial partition extends across the intermediate volume between and joined at opposite edges to the inner and outer walls, being spaced from the first radial partition so as to form an arcuate sedimentation zone in the intermediate volume bounded by segments of the inner and outer walls. Means are provided for introducing and distributing feed liquid-solid in the arcuate sedimentation zone for sedimentation therein to form a solids-depleted liquid in the upper part of the zone and a layer of settled solids in the bottom part thereof, with means for discharging solids-depleted liquid from the upper part of the sedimentation zone.

In accordance with the invention, means are provided for collecting and removing settled solids from the bottom part of the sedimentation zone. These means include a solids collection trough extending around one of the inner and outer wall segments at the bottom of the sedimentation zone. A bridge is provided extending radially across and above the sedimentation zone, with mechanical drive means for moving the bridge in an arcuate path reciprocatingly and repetitively around the arcuate sedimentation zone between the first and second radial partitions. The apparatus includes a scraper blade extending transversely across the sedimentation zone at the bottom thereof and having one end adjacent the solids collection trough. A first cable means join an inner part of the bridge and an inner part of the scraper blade and second cable means join an outer part of the bridge and an outer part of the scraper blade, for drawing the scraper blade in an arcuate path around the arcuate sedimentation zone in trailing relationship to the points of attachment of the first and second cable means to the bridge. In this arrangement, the cable means nearer the solids collection trough are longer in length than the other cable means such that the scraper blade is disposed at an acute angle with respect to the radially extending bridge during movement of the bridge around the sedimentation zone, whereby the solids settled in the bottom part of the sedimentation zone are collected and transferred by the blade to the solids collection trough during the drawing of the blade around the sedimentation zone in both directions of movement. A third cable means join one of the inner and outer parts of the scraper blade with an opposite part of the bridge, to restrict transverse movement of the scraper blade during movement of the bridge around the sedimentation zone. Means are further provided for shortening the suspended lengths of the first and second cable means at the approach of the bridge to each radial partition, whereby the scraper blade is drawn toward the radial partition for radial alignment therewith, and for increasing the suspended lengths of the first and second cable means after the radial alignment upon reciprocal movement of the bridge toward the other radial partition, so as to eliminate solids accumulation adjacent the radial partitions. Means are also provided for withdrawal of collected solids from the solids collection trough.

As used herein, the term "suspended length of said first and second cable means" is taken as referring to lengths of the respective cables which are disposed for actively drawing the scraper blade along the arcuate path of travel around the sedimentation zone as measured linearly along those cables from their lower point of attachment to the scraper blade upwardly to either a point of attachment or other point of support of the cables. As analogized with the characteristics of a pendulum, the aforedescribed scraper arrangement may be regarded as comprising the scraper blade as a suspended body connected to an instantaneous fixed point, i.e. the point of attachment or support, by the suspended cable length. Thus, as the suspended length of the cable is shortened at the approach of the bridges to a radial partition, the scraper blade as a suspended body is induced to swing more or less freely toward the partition to achieve radial alignment therewith.

Depending on the relative rates of shortening of the suspended cable lengths, and the specific structural features of the arcuate sedimentation zone and scraper apparatus, the scraper blade may remain relatively close to the bottom of the sedimentation zone as it swings toward the radial partition for alignment or the blade may, at higher rates of shortening, be lifted upwardly from the bottom and swung toward the radial partition wall. In the first mode of operation, the scraper blade tends to avoid solids accumulation in the end wall regions by displacement of the settled solids and associated liquid from the bottom areas in front of the blade face moving toward the end wall partition to the bottom areas behind the blade face, so that the displaced solids are removed from the end wall regions by the scraper blade during its reverse traverse when the suspended lengths of the first and second cable means are increased after the radial alignment upon reciprocal movement of the bridge toward the other radial partition. In the second mode of operation, the scraper blade passes over the sedimented solids in the end wall regions as it swings toward the radial partition wall with subsequent removal of these solids by the scraper blade during its reverse movement in the same manner as described for the first mode. In the second mode of operation, it is perticularly desirable to lift the scraper blade from the bottom by the aforementioned shortening of the first and second cable means so that it is swung toward the end wall and radially aligned therewith above the bottom of the sedimentation zone and thereafter to lower the aligned scraper blade to the bottom of the sedimentation zone at the wall by the aforementioned lengthening of the first and second cable means prior to movement of the scraper blade toward the other radial partition end wall. It may also be suitable under the second mode of operation to momentarily shorten the suspended cable lengths as the bridge approaches the radial partition so that the blade is swung over an arcuate trajectory toward the radial partition wall so that the blade aligns with the end wall and recontacts the bottom of the sedimentation zone at more or less the same time. The first mode of operation may be suitable in practice where the sedimented solids are finely dispersed, but where large solids and solid extraneous matter are present, it is desirable to swing the blade over the settled solids as it moves toward the radial partition walls, in order to avoid "packing" solids against the partitions such as would interfere with the proper radial alignment of the scrapper blade. In this respect, it may be desirable in some applications to further decrease the possibility of solids disposition in the end wall regions of the sedimentation zone by designing the bottom so that it curves or is bevelled upwardly to the radial partition in such regions, thus eliminating sharp corners at the intersection of the bottom and walls which tend to accumulate solids. Such geometry has been found to be particularly suitable in the case where the blade is lifted from the bottom of the sedimentation zone and then is lowered again to the bottom after radial alignment with the partition has been achieved, as described above.

In one preferred embodiment of the invention, the means for shortening the suspended lengths of the first and second cable means at the approach of the bridge to each radial partition, and for increasing the suspended lengths of the first and second cable means after the radial alignment upon reciprocal movement of the bridge toward the other radial partition suitably include reversible electric motor means operatively connected with a rotatable shaft mounted on the bridge and extending longitudinally along the bridge from the inner part to the outer part thereof. In this arrangement, the shaft has first pulley means fixedly mounted thereon at its inner part and connected to the first cable means and second pulley means fixedly mounted thereon at its outer part and connected to the second cable means. Means are provided for actuating the electric motor means at the approach of the bridge to a radial partition to cause the first and second cable means to be wound onto the respective pulley means to a predetermined extent for the shortening thereof and for reversingly actuating the electric motor means after the radial alignment upon reciprocal movement of the bridge toward the other radial partition to cause the first and second cable means to be unwound from the respective pulley means to a predetermined extent for the aforementioned increasing the suspended lengths thereof.

In another preferred embodiment of the invention, the means for shortening the suspended lengths of the first and second cable means at the approach of the bridge to each radial partition and for increasing the suspended lengths of the first and second cable means after the radial alignment upon reciprocal movement of the bridge toward the other radial partition comprise structural projection members joined to the bridge at the respective inner and outer parts thereof extending transversely outwardly from the bridge at both sides thereof at an elevation above the upper ends of the radial partition. In this embodiment, each of the respective cable means comprise cables joined to the outer portions of the structural projection members at one end and joined to the scraper blade at the opposite ends. Rotatable roller means are mounted on the upper ends of the radial partititions at inner and outer parts thereof. These roller means are arranged for contact with the cables joined to the adjacent one side of the bridge upon the approach of the bridge to a radial partition, whereby the adjacent cable of the cable means nearer the solids collection trough initially engages the correspondingly positioned roller upon the approach and is slidingly translated thereacross such that the suspended length of that adjacent cable is shortened and thereafter the adjacent cable of the outer cable means engages its correspondingly positioned roller and is slidably translated thereacross to shorten the suspended length of the other adjacent cable, for radial alignment with the radial partition. In such arrangement, the cables joined to the structural projection members on the other side of the bridge farther from the radial partition thereafter serve to draw the scraper blade in the reverse direction whereby the suspended lengths of the first and second cable means are increased after radial alignment upon reciprocal movement of the bridge toward the other radial partition.

As used herein, the term "cable means" is taken as referring to any suitable flexible suspension means, as for example, cables, ropes, wires and the like.

As mentioned, the third cable means of the invention join one of the inner and outer parts of the scraper blade with an opposite part of the bridge, to counteract the forces on the scraper blade which would tend to move it in the transverse direction during movement of the bridge around the sedimentation zone. Generally, when the bottom of the arcuate sedimentation zone is flat, the third cable means preferably join the part of the scraper blade nearer the solids collection trough with an opposite part of the bridge. In some applications, however, it may be desirable to slope the bottom of the sedimentation zone radially downwardly toward the solids collection trough. Where the solids collection trough is located adjacent the inner wall with the bottom of the sedimentation zone sloping toward it, the third cable means preferably join the inner part of the scraper blade, i.e., the part nearer the solids collection trough, with an outer part of the bridge.

Where, however, the solids collection trough is positioned adjacent the outer wall with the bottom of the sedimentation zone sloping toward it, then the configuration of attachment of the third cable means to the bridge and scraper blade may have to be determined, either by suitable calculation or experiment to insure the most effective arrangement for minimizing transverse movement of the blade during movement of the bridge around the sedimentation zone.

Sludge collection and removal devices constructed in accordance with the present invention have been employed in municipal wastewater treatment integral circular plants featuring arcuate sedimentation zones and in such application have been found to perform admirably in eliminating unscraped dead space adjacent the radial partition end walls and resulting solids accumulations in the end wall regions.

DESCRIPTION OF THE PREFERRED EMBODIMENTS

Figure 1:
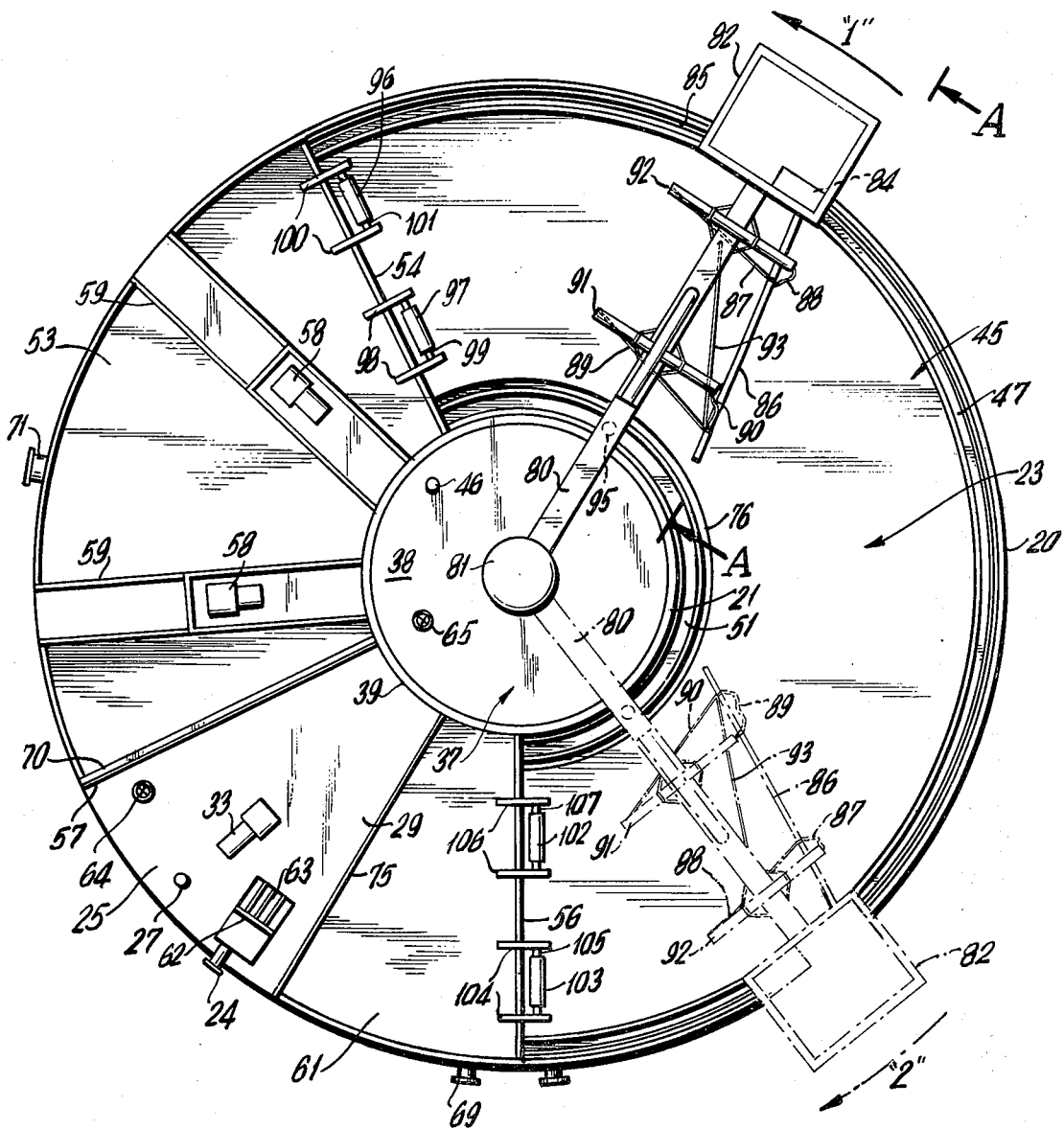
FIG. 1 is a plan view of an integral circular wastewater treatment plant incorporating the invention.

Referring now to the drawings, FIG. 1 is a plan view of an activated sludge integral circular wastewater treatment plant featuring a sludge collection and removal device constructed in accordance with the present invention. The illustrated plant is of a general type as disclosed and claimed in the aforementioned U.S. Pat. No. 3,890,231 to L. M. LaClair et al., incorporated herein to the extent pertinent. The plant includes circular tank outer wall 20 and circular inner wall 21 concentric with and spaced from outer wall 20 forming an inner volume 38 and an intermediate volume 23 between the inner and outer walls. The ratio of the inner wall radius $R_1$ to the outer wall radius $R_2$ in this plant is preferably between 0.25 and 0.70, for reasons to be discussed more full hereinafter.

The illustrated plant comprises a plurality of treatment zones including arcuate first aeration zone 25, central second aeration 37, arcuate aerobic digestion zone 53, and first arcuate portion sedimentation zone 45. Also included is arcuate chlorination zone 61. In this plant a first radial partition 54 extends across the intermediate volume 23 between and joined at opposite edges to the inner wall 21 and the outer wall 20. Second radial partition 56 likewise extends across the intermediate volume between and jointed at opposite edges to the inner and outer walls, being spaced from the first radial partition 54 to form the first arcuate portion sedimentation zone 45 in the intermediate volume bounded by segments of the inner and outer walls comprising 190° of their respective circumferences, and a second arcuate portion comprising the remainder of the intermediate volume and containing the aforementioned arcuate chlorination zone 61, arcuate first aeration zone 25, and arcuate aerobic digestion zone 53. As used hereinafter the terms "arcuate portion" and "arcuate zone" refer to enclosed parts of the integral circular plant bounded on the outside by the circular tank outer wall, on the inside by the circular inner wall, and on the ends by radially extended end walls with the circumferential length of the concentric inner and outer walls serving to define arc lengths of less than 360°.

As illustrated, first aeration zone 25 is an arcuate portion of the plant and is enclosed by overhead cover 29. Feed wastewater is introduced to first aeration zone 25 through inlet conduit 24 stop gate 62 and bar screen 63.

Oxygen aeration feed gas is introduced through overhead conduit 27, and collected sludge solids recycled from clarifier 45 by means of overhead circular receptacle through 51 extending around the outer periphery of inner wall 21 between first radial partition 54 and second radial partition 56. Slight positive gas pressure is maintained under the first aeration zone cover to prevent back mixing of gas between joining aeration zones 25 and 37. The first and second aeration zones are provided with pressure relief valves 64 and 65 respectively. First fluid mixing and recirculation means 33 are provided in the first aeration zone and may suitably comprise a rotatable impeller positioned at the liquor surface a sub-surface propeller positioned beneath the impeller with a common shaft joining the impeller and propeller and extending through cover 29, and motor drive means connected to the shaft for rotation thereof. In such arrangement, the sub-surface propeller performs the function of continuous sub-surface mixing of the fluids, while the impeller throws sheets of liquor outwardly against the gas and performs the continuous recirculation function (of liquor). If the aeration zone is shallow the surface impeller may perform both functions and a sub-surface impeller may be unnecessary. Other mechanical means for fluid mixing and recirculation may be employed, for example a system including a sub-surface propeller, a gas sparger and a gas recirculation pump joined to the gas space above the liquor and beneath the cover. In this alternative arrangement, the gas sparger may be positioned at the bottom end of a hollow vertical rotatable shaft, with the propeller also mounted on the shaft above the sparger. The gas recirculation pump may be mounted on the cover with its inlet side joined to the gas space by a conduit through the cover. The pump discharge side is joined to the top end of the rotatable shaft for recirculation of oxygen gas to the sparger and thence into the liquor.

The collected withdrawn sludge is recycled to first aeration zone 25 at a rate so as to maintain the desired total solids concentration (MLSS) as for example 6000 mg/l and volatile suspended solids concentration (MLVSS) as for example 4500 mg/l. Broad suitable ranges for these parameters are 4000–8000 mg/l MLSS and 3000–6000 mg/l MLVSS. The food-to-biomass ratio may be in the range of 0.5 –1.55 gm $BOD_5$/day × gm MLVSS, for example about 0.68. The recycled sludge concentration (MLSS) is in the range of 15,000–50,000 mg/l. The oxygen gas is introduced in sufficient quantity to maintain dissolved oxygen concentration (D.O.) in the mixed liquor of 4–8 mg/l and for example 6 mg/l. In order to control the D.O. of the mixed liquor, an oxygen control valve (not shown) may suitably be disposed in the oxygen feed gas conduit 27 and automatically adjusted in response to sensed oxygen vapor pressure in the gas space overlying the mixed liquor in the aeration zone by suitable sensing and control signal transmitting means as is well known in the art.

The previously described mechanical fluid mixing and recirculation system promotes transfer of oxygen to the mixed liquor in the first aeration zone 25, the biomass assimulates and metabolizes BOD leading to production of $CO_2$, water and additional microorganisms. Oxygen is consumed and the gas purity in the space above the mixed liquor decreases. The fluids in the first aeration zone are mixed for the desired period, e.g. 45 minutes liquid residence time, and the resulting first oxygenated liquor is discharged through an opening in inner wall 21 below the liquor-gas interface to second aeration zone 37. Simultaneously, oxygen-depleted gas from the first aeration zone 25 is passed through first gas inner zone transfer means such as an opening in the dividing segment of inner wall 21 above the liquor-gas interface to second zone 37 and the fluids are again mixed in this zone by second fluid mixing and recirculation means which may suitably be of the aforementioned type comprising a propeller, impeller, shaft, and motor. Second aeration zone 37 is enclosed by cover 39, and the operating parameters may be substantially the same as previously discussed in connection with the first aeration zone 25. After the desired liquid residence time, as for example 45 minutes, the second oxygenated liquor is discharged from second zone 37 through liquid passage means in the inner wall 21 and to clarifier zone 45 bounded by inner wall 21, outer wall 20 and first and second radial partitions 54 and 56 respectively. Oxygen-further depleted gas is discharged from second aeration zone 37 through gas vent means 46. It will be noted that the gas discharge means from each of first and second aeration zones 25 and 37 are spaced from the gas inlet means to the respective zones so as to avoid bypassing gradient.

The oxygenated liquor entering clarifier zone 45 flows radially across this zone towards outer wall 20 and the solids settle from the liquid during this radial path. Trough means 47 extend around the outer wall end segment of the clarifier 45 for discharging clarified water therefrom. As used herein, trough means 47 include any means for collecting and removing clarified water as for example the illustrated open conduit, or a submerged perforated conduit. The means provided for collecting and removing activated sludge settled solids from the bottom part of clarifier 45, as described hereinafter, convey collected solids to the overhead receptacle trough 51 for return of at least part of the sludge to the first aeration zone 25. The non recycled sludge is transferred by trough 51 to aerobic digestion zone 53, also provided with mechanical fluid mixing and recirculation means similar to the corresponding means used in the first and second aeration zones. The aforementioned mixing-recirculation means and drive motors 58 may be supported on bridges 59. The arcuate aerobic digestion zone 53 adjoins the first aeration zone 25 and is separated therefrom by third radial partition 57 and is separated from the clarifier portion by first radial partition 54. The first aeration zone 25 is separated from the arcuate chlorination zone 61 by fourth radial partition 75 and the chlorination zone is separated from the clarifier portion by second radial partition 56. All of the aforementioned radial partitions extend to the floor of the plant between outer and inner walls 20 and 21.

In the aerobic digestion zone 53, oxygen gas may be supplied from an external source or at least in part from the second aeration zone vent. Solids digestion is carried out in zone 53 with supernatant liquid being returned if desired to first aeration zone 25 through stilling well 70. Waste sludge is discharged from digestion zone 53 through conduit 71. In the arcuate clarifier 45, the clarified water entering effluent trough 47 flows into chlorination zone 61 by a transfer opening in second radial partition 56 for disinfection and is then discharged from the plant through effluent conduit 69.

The provision of an arcuate sedimentation zone in the aforedescribed plant permits a highly efficient separation of the mixed liquor liquid-solid produced in the plant to be achieved. To effectively use the entire area provided in the clarifier, the length of the liquor flow path must be at least equal to and at peak flow conditions preferably identical with the path length necessary for sedimentation. If the sedimentation path is shorter than the actual path provided for liquor travel then distribution of solids will occur over only part of the clarifier area. Under these circumstances the clarifier has been over designed and the integral plant is larger than necessary. If the sedimentation path is longer than the actual path provided for liquor travel then a gross loss of solids may occur in the clarifier effluent. In the aforedescribed type of plant, the clarifier arc length may be foreshortened to as little as 90° without causing the sedimentation path length to exceed the actual liquid flow path length, and the remaining peripheral portion of the plant may, as described, be employed for other purposes as for example, aeration, digestion of the activated sludge, and chlorination of the clarifier effluent. To achieve the desired wastewater treatment with oxygen gas so as to effectively utilize the relatively expensive oxygen, reduce the BOD content of the effluent to an acceptable level and obtain activated sludge having superior settling characteristics, it is necessary to employ at least two separate oxygen aeration zones with the oxygen depleted gas from the first zone being transferred to the second aeration zone and the first oxygenated liquor also being transferred to the second aeration zone.

As mentioned the arc length of the clarifier zone of this plant may be as low as 90° and still provide an actual liquid flow path length at least as long as the sedimentation path length. From a theoretical standpoint, it should be possible (if desired) to employ a fully extended 360° clarifier zone in the integral circular wastewater treatment plant, since at this arc length the sedimentation path length based on idealized conditions is still less than the actual provided flow path length. However for such an arc length in a fixed diameter plant, the inner to outer wall distance in the clarifier is a minimum since the inner wall diameter must be increased to provide the entire required volume for at least two aeration zones. With such narrow clarifier portion widths the hydraulic effects associated with clarifier inlet and outlet disturbances become increasingly important and adversely effect clarifier performance. For this reason the clarifier arcuate portion should not exceed 330° so as to obtain suitably long inner to outer wall widths and satisfactory hydraulic conditions at the inner wall where oxygenated liquor is introduced and the outer wall where the clarified effluent is discharged.

It has previously been indicated that the ratio of the inner wall radius ($R_1$) to the outer wall radius ($R_2$) in the general type of plant shown in FIG. 1 must be between 0.25 and 0.70. If $R_1/R_2$ exceeds 0.70 the intermediate volume becomes too narrow to accommodate arcuate aeration zones with uniformly good mixing characterisitcs, i.e. the zones would be excessively long relative to their width. Also, the arcuate clarifier portion would be so narrow as to develop aberrant flow phenomena, with a prohibitively low actual liquor radial flow path to the outer wall. Such proximity of inlet and outlet areas is likely to promote channeling and short-circuiting. If $R_1/R_2$ is less than 0.25, the center zone becomes very small in area compared to the total plant area. The inner wall of the arcuate clarifier is very short circumferentially and defines a very localized oxygenated liquor distribution area which tends to create turbulence which is detrimental to liquid-solids separation. A preferred balance of the foregoing considerations is an $R_1/R_2$ range between 0.30 and 0.60.

With regard now to the means for collecting and removing settled solids from the bottom part of the arcuate sedimentation zone in the FIG. 1 plant, the apparatus features a sludge solids collection trough 76 extending around the inner wall segment at the bottom of sedimentation zone 45. Bridge 80 extends radially across and above the sedimentation zone and is powered by reciprocating mechanical drive means 81 which moves the bridge in an arcuate path reciprocatingly and repetitively around the arcuate sedimentation zone between the first and second radial partitions 54 and 56 respectively. The bridge 80 is supported at the outer wall 20 by means of a wheel or roller assembly 84 disposed in structural frame 82. A wheel of the assembly 84 engages track 85 attached to the segment of outer wall 20 bounding the sedimentation zone 45. As depicted in the drawing, the bridge is shown at position "1" moving in a counterclockwise direction toward first radial partition 54, while the point "2" dashed line representation shows the bridge assembly after it has reversed its direction and is traveling in a clockwise direction toward second radial partition 56.

Suspended from the bridge 80 by cables is a scraper blade 86 extending transversely across the sedimentation zone at the bottom thereof with one end, the inner end, disposed adjacent the sludge solids collection trough. The bridge assembly includes structural projection members, inner projection number 91 and outer projection number 92, joined by brackets or other suitable joining means to bridge 80 at the respective inner and outer parts thereof. These members extend transversely outwardly from the bridge at both sides thereof, at an elevation above the upper ends of the radial partitions 54 and 56. First cable means comprising cables 89 and 90 are joined to an inner part of scraper blade 86 at one end and the opposite ends of these cables are joined to the outer portions of the inner structural projection member 91, which in turn is joined to the inner part of bridge 80. In like fashion, second cable means comprising cables 87 and 88 are joined to an outer part of the scraper blade 86 at one end, and the opposite ends of the cables are respectively joined on either side of the bridge 80 to the outer portions of the outer structural projection number 92 which in turn is joined to an outer part of the bridge. The first and second cable means thus permit the scraper blade to be drawn in an arcuate path around the sedimentation zone 45. The lengths of the first and second cable means are such that the scraper blade is drawn in trailing relationship to the points of attachment of the first and second cable means to the bridge, by means of the interconnecting structual projection numbers 91 and 92.

It is apparent that in the arrangement shown, only one cable of each of the respective first and second cables means is actively engaged in drawing the scraper along the bottom of the sedimentation zone at any given moment in time. Thus, at point "1", when the bridge assembly is moving in a counterclockwise direction, cables 87 and 89 are taut and fully extended as the active drawing cables while cables 88 and 90 are loose and inactive. Whereas at point "2", after reversal of direction with the bridge assembly moving in the clockwise direction, cables 88 and 90 are taut and fully extended as the active drawing cables while the formerly active cables 87 and 89 are loosely extended and not involved in the drawing of the scraper blade.

In this arrangement the first cable means nearer the sludge solids collection trough are longer in length than the second cable means, such that the scraper blade 86 is disposed at an acute angle with respect to the radially extending bridge during its movement around the sedimentation zone. In this manner the thickened sludge solids settled in the bottom part of the sedimentation zone are collected and transferred by the scraper blade to the solids collection trough during the drawing of the blade around the sedimentation zone in both directions of movement. Third cable means 93 join the inner part of the scraper blade with the outer part of the bridge 80. In the practice of the present invention, it is essential that one of the inner and outer parts of the scraper blade be joined by third cable means with an opposite part of the bridge, to restrict transverse movement of the scraper blade during movement of the bridge around the sedimentation zone. The purpose of such cable means is to insure that the scraper blade will remain in close proximity to the wall segment of the sedimentation zone opposite the wall segment around which the solids collection trough is disposed, thereby avoiding the formation of dead space adjacent the former wall segment which would otherwise occur if such third cable means were not used. In this respect, the length of the scraper blade 86 is preferably substantially equal to the radial distance from the solids collection trough 76 to the opposite circular wall segment of outer wall 20 of the arcuate sedimentation zone. After the thickened sludge solids are moved by the blade 86 into the bottom solids collection trough 76, collected solids are withdrawn therefrom and passed to overhead solids receptacle trough 51 by means 95 to be described hereinafter.

In the broad practice of the present invention, means are provided for shortening the suspended length of the first and second cable means at the approach of the bridge to each radial partition end wall of the arcuate sedimentation zone, whereby the scraper blade is drawn toward the radial partitions for radial alignment therewith, and for increasing the suspended length of the cable means after the radial alignment upon reciprocal movement of the bridge toward the radial partition at the outer end of the sedimentation zone, to eliminate solids accumulations adjacent the radial partitions. In the FIG. 1 embodiment of the invention, these means include the roller assemblies mounted on the upper ends of the radial partitions 54 and 56 of sedimentation zone 45. At the first radial partition 54, an inner rotatable roller 97 is disposed on roller shaft 99 attached to spar members 98 in turn attached to the upper end of the partition wall as by suitable bracket and bolt means, and outer rotatable roller 96 is disposed on roller shaft 101 between spar members 100. Similar assemblies, comprising rollers 102 and 103, roller shafts 105 and 107 and spar numbers 104 and 106, are positioned at the second radial partition 56. The operation of these rollers assemblies will be described in greater detail hereinafter.

Figure 2:
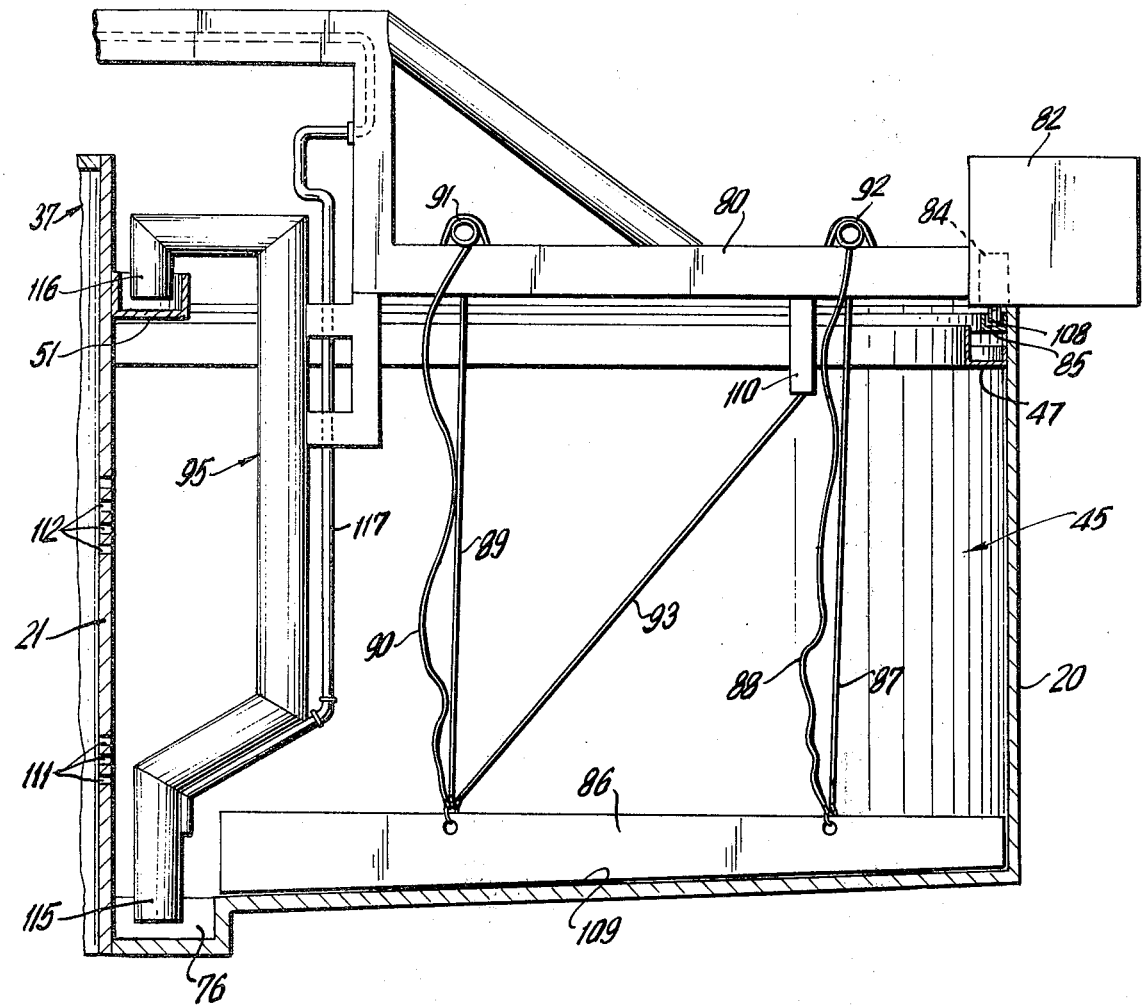
FIG. 2 is an elevation view of the FIG. 1 plant taken in cross-section along line A—A showing the structural details of the solids collection and removal device.

FIG. 2 is a elevation view of the FIG. 1 plant taken in cross-section along line A—A showing the structural details of the solids collection and removal means. In the apparatus the means for introducing mixed liquor feed liquid-solid from the second aeration zone 37 comprise vertically spaced arrays of openings 111 and 112 in the inner circular segment of wall 21 separating the second aeration zone 37 from the arcuate sedimentation zone 45. These arrays of openings serve to uniformly distribute the feed liquid-solid around the inner wall segment for radial flow across the arcuate sedimentation zone. During the radial flow of the liquid-solid across the sedimentation zone, the solids settle to the bottom floor 109 of the zone which slopes from the outer circular wall 20 radially downwardly toward the solid collection trough 76. These settled solids are moved by the scraper blade into trough 76 while solids-depleted liquid is discharged from the upper part of the sedimentation zone by means of the effluent trough 47 which extends around the upper part of the outer wall segment of the arcuate sedimentation zone. As shown and previously described, the first cable means comprising cables 89 and 90 are joined at one end to bridge 80 by means of inner structural projection member 91 and at the opposite ends to the scraper blade 86, with the second cable means comprising cables 87 and 88 being similarly joined to the scraper blade and to the outer structural projection member 92. The third cable means 93 is joined at its lower end to scraper blade 86 and at its upper end to the bridge 80 by means of vertical spar 110.

The means for withdrawal of collected solids from the solids collection trough 76 in the FIG. 2 system comprises a conduit 95 mounted to the bridge 80. Conduit 95 has a lower end 115 positioned in the solids collection trough 76 and an upper end 116 disposed in flow communication with overhead sludge receptacle trough 51. Pump means are mounted on the bridge, including an air lift blower (not shown), joined to the lower conduit portion of 95 via air line 117 passing through the bridge structure to introduce air into conduit 95 for moving withdrawn solids therethrough by airlift pumping.

Figure 3:
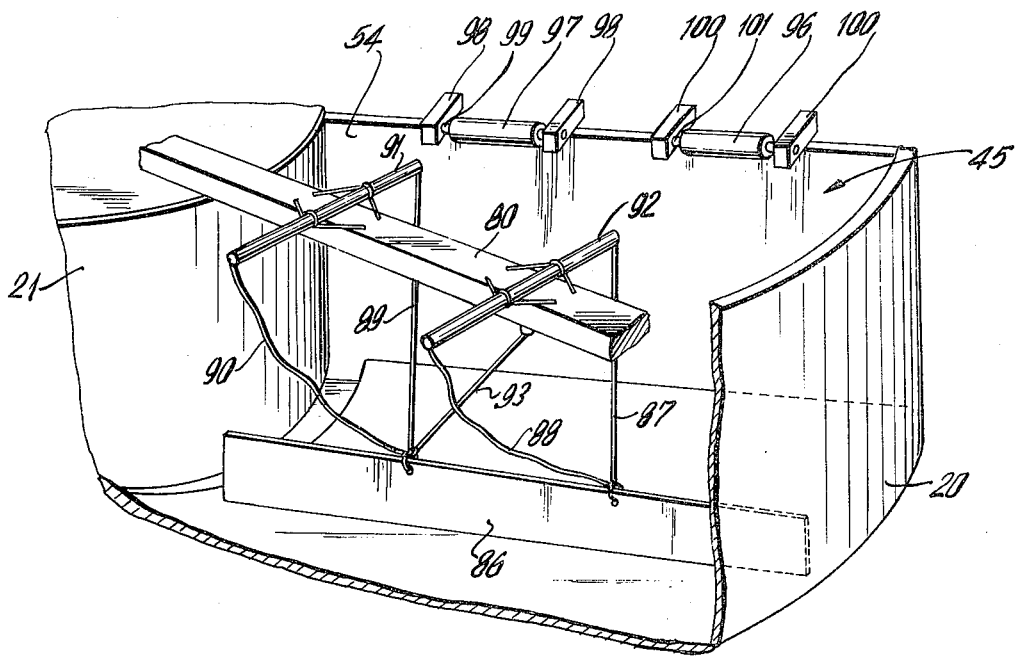
FIG. 3 is an isometric view of the end section of the sedimentation zone of the FIG. 1 plant illustrating the operation of the solids collection and removal device during its traverse of the arcuate path in the zone.

FIG. 3 is a simplified isometric view of the end section of the FIG. 1 plant illustrating the operation of the scraper device during its traverse of the arcuate path in the arcuate sedimentation zone. Cables 87 and 89 are taut and fully extended as the active drawing cables drawing the scraper blade 86 in trailing relationship to the points of attachment of these cables to the respective inner and outer structural projection numbers of the bridge assembly. The cables 89 and 90 are each substantially the same length, as are the cables 87 and 88; however, the former pairs, i.e., the first cable means, are longer in length than the latter second cable means such that the scraper blade is disposed at an acute angle with respect to the radially extending bridge during movement to most effectively direct settled solids into the solids collection trough.

Figure 4:
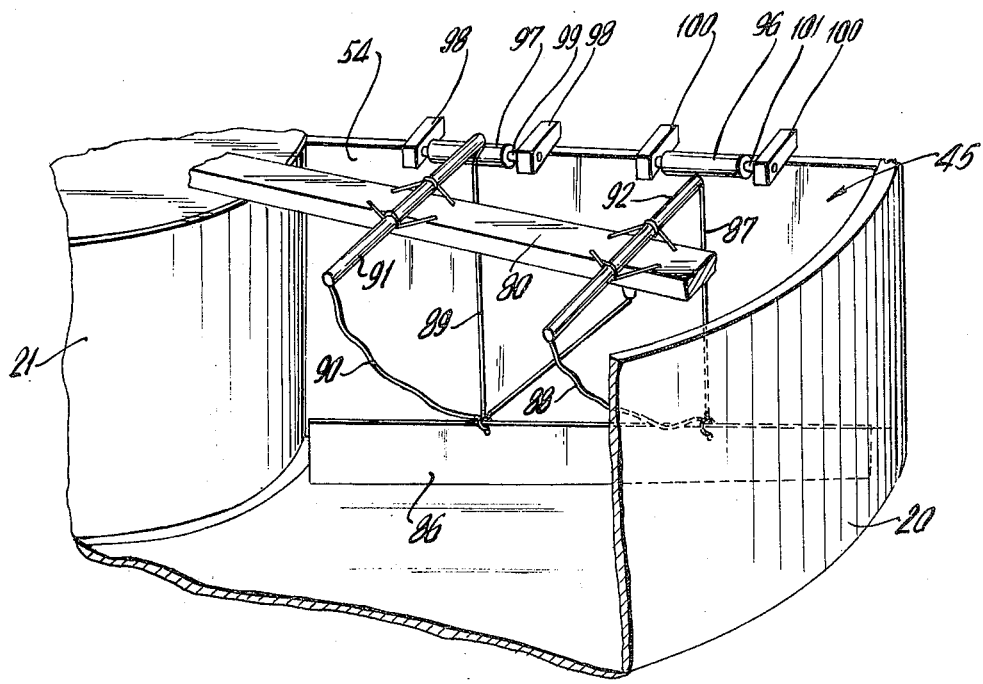
FIG. 4 is an isometric view of the end section of the sedimentation zone of the FIG. 1 plant illustrating the operation of the sludge collection and removal device at the radial partition end wall of the zone.

FIG. 4 is a simplified isometric view of the end section of the sedimentation zone generally corresponding to that of FIG. 3 but displaced in time to show the operation of the sludge collection and removal apparatus at the radial partition end wall of the zone. As the bridge and associated scraper blade assembly approach the first radial partition 54, the inner adjacent cable 89 of the first cable means initially engages inner roller 97 and is slidingly translated across the roller such that the suspended length of the inner adjacent cable 89 (the linear length along the cable from the point of attachment to the scraper blade 86 upwardly to the first point of contact with the roller) is increasingly shortened. As the suspended length of cable 89 shortens the inner part of the scraper blade 86 will move toward the radial partition 54 more than the outer end until, as the bridge continues to move toward the partition, the outer adjacent cable 87 of the second cable means will engage the outer roller 96 and be slidingly translated across the roller to shorten the suspended length of the outer adjacent cable. As the respective adjacent cables are shortened, the scraper blade is swung toward the radial partition and radially aligns with it. At this point, the scraper blade may be lifted from the bottom of the arcuate sedimentation zone to a greater or lesser extent depending on the extent of travel of the bridge at the end wall region. After the scraper blade is radially aligned against the partition wall, the aforementioned drive means for the bridge are reversed to move the bridge away from partition 54 and around the arcuate sedimentation zone toward the opposite radial partition. Hence, after the radial alignment of the scraper blade with the partition 54, the cables 88 and 90 joined to the structural projection numbers 91 and 92 on the other side of the bridge farther from the radial partition thereafter serve to draw the scraper blade 86 in the reverse direction whereby the suspended length of the first and second cable means are increased as the cables 88 and 90 become the active drawing cables upon reciprocal movement of the bridge toward the other radial partition. In this manner solids accumulation adjacent the wall regions of the respective radial partitions is effectively avoided.

Figure 5:
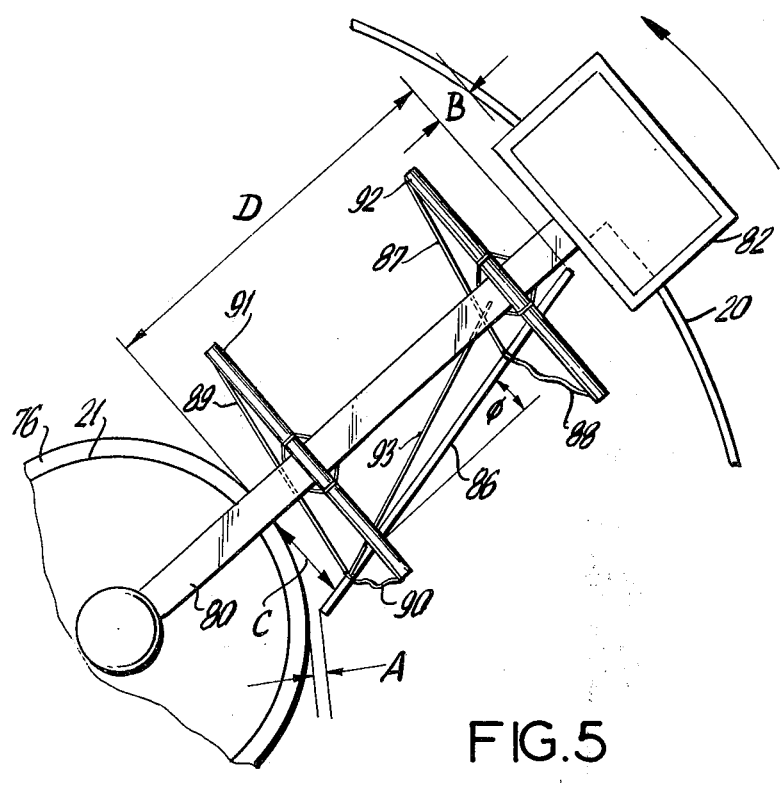
FIG. 5 is an enlarged sectional plan view of the scraper and bridge assembly of the FIG. 1 plant showing the dimensional characteristics of the apparatus.

FIG. 5 is an enlarged partial sectional plan view of the scraper and bridge assembly of the FIG. 1 plant showing dimensional characteristics of this apparatus. With reference first to the plant as shown in FIG. 1, the diameter of the central second aeration zone as measured across the inner circular wall 21 bounding the zone, may be 21.5 feet, with the outer circular wall 20 having a diameter of 66.5 feet, such that the ratio of the inner wall radius ($R_1$) to the outer wall radius ($R_2$) is 0.323. The first and second aeration zones have a total volume of 65,100 gal. and oxygen aeration gas at 90% oxygen purity (by volume) is supplied to the aeration zones at the rate of 1,460 lbs. $O_2$/day. The aerator power in the first aeration zone is 10 horsepower and in the second aeration zone the aerator power is 7.5 horsepower. The arcuate sedimentation zone 45 has a volume of 150,000 gallons with an effluent overflow rate, for a nominal daily flow of 1.0 million gal./day at 200 mg./l of influent $BOD_5$, of 600 gal./day/ft.$^2$ of sedimentation zone cross-sectional area. In the aerobic digestion zone, oxygen is supplied at the rate of 500 lbs. $O_2$/day and the aeration power is 7.5 horsepower and the volume of the digestion zone is 37,500 gallons. Collected sludge solids are returned to the first aeration zone from the overhead sludge receptacle trough 51 at a volumetric sludge recycle ratio R/Q of 0.3 wherein R is the volumetric activated sludge recycle flow rate and Q is the volumetric flow of liquid effluent from the arcuate sedimentation zone. With this rate of activated sludge recirculation, the concentration of mixed liquor volatile suspended solids in the aeration is maintained at 4,500 mg./l. The arcuate sedimentation zone has an arc length of 190°. The inner roller assemblies, comprising roller 97 mounted on the upper end of first radial partition 54 and roller 103 on the second radial partition 56, are each positioned with their inner ends 46 inches from inner wall 21, and the outer roller assemblies including respective rollers 96 and 102 are positioned with their outer ends 53 inches from outer wall 20. The bottom of the arcuate sedimentation zone is sloped radially downwardly from the outer wall segment to the sludge trough adjacent the inner wall segment at a rate of 1 foot increase in the depth of the sedimentation zone for each 12 feet of radial distance from the wall to the sludge trough; thus the difference in depth between the depth at the outer wall and the depth immediately adjacent the sludge trough is 1.77 feet.

Referring now to FIG. 5, as based on the foregoing illustrative description of the plant, the scraper blade 86 has a length of approximately 21.25 feet and a height, as measured vertically from the points of cable attachment to the scraper blade to the bottom of the sedimentation zone, of approximately 6 inches and is drawn by bridge 80 around the arcuate sedimentation zone at a rate of 10 ft./min. The settled sludge solids collection trough 76 has a width, as measured radially from the inner circular wall 21, of approximately 0.75 feet. The first cable means comprising cables 89 and 90 are each 17.5 feet in length and the cables 87 and 88 of the second cable means are each 15.3 feet in length. Third cable means cable 93 is 13.0 feet long, and the structural projection numbers 91 and 92 are each 14.0 feet in length. In this arrangement the vertical distance between the points of attachment of the first cable means to the bridge and the floor of the sedimentation zone is 15.5 feet and the corresponding vertical distance for the second cable means is 14.75 feet.

During operation, the scraper blade is drawn by the bridge around the arcuate sedimentation zone 45 such that the blade is disposed at an acute angle with respect to the radially extending bridge, as measured by angle $\phi$ in the FIG. 5 schematic, which is preferably in the range of 10° to 26°. It has been found that with angles $\phi$ greater than 26°, the clearances between the inner and outer ends of the blade with the sludge trough and outer wall respectively become too large for effective operation. These clearances are shown in FIG. 5 as the radial distance A measured between the inner end of scraper blade 86 and the outer end of sludge solids collection trough 76 and as the radial distance B measured between the outer end of scraper blade 86 and the outer wall 20. Dimension C is the distance measured along a tangent to the outer edge of solids collection trough 76 in the direction of rotation from the point of intersection of the tangent with the outer circumference of the trough to the point of intersection with the scraper blade. Dimension D is the radial distance from this tangent to the outer end of the scraper blade. The angle $\phi$ is preferably not less than 10° to provide effective movement of solids by the blade inwardly to the solids collection trough.

Figure 6:
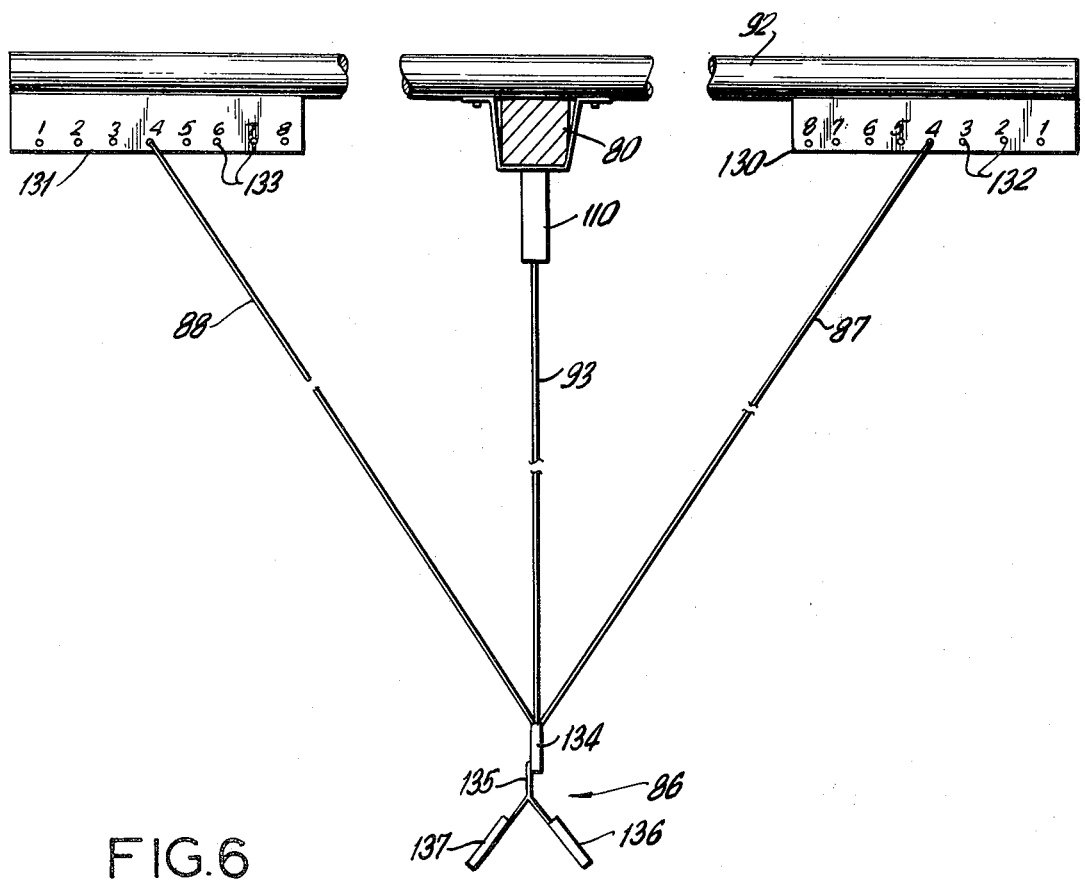
FIG. 6 is an elevation view of the FIG. 5 apparatus showing the features of the scraper blade and the structural projection members

FIG. 6 is a simplified view of the FIG. 5 apparatus showing the features of the scraper blade 86 and structural projection member 92, as removed from the arcuate sedimentation zone.

The apparatus includes means for adjusting the altitude of the scraper blade 86, comprising vertically depending plate members 130 and 131 rigidly attached at their upper edges to the respective outer portions of the structural projection member 92, as by welding. Each of these plate numbers may for example be 24 inches in length and 2 inches in height and is provided with a plurality of holes 132 and 133 respectively for attachment of the cable means. As shown, eight holes are provided in each plate number. Each of the holes is three-eighths inch in diameter and the holes are spaced apart at 3 inch spacings, as measured center-to-center. Although only the outer portion of the bridge assembly has been shown in FIG. 5 for ease of illustration, it will be understood that the inner portion is similarly constructed with respect to the features of inner structural projection number 91.

By attaching the cables 87 and 88 to various selected holes in the respective plate numbers 130 and 131, the angle $\phi$ of the scraper blade may be correspondingly varied. Cables 89 and 90 of the first cable means are each attached to the same corresponding adjustment holes, as are each of the respective cables 87 and 88 of the second cable means. However, the first and second cable means need not be attached to the same corresponding adjustment holes, as shown in Table I below, which shows the values of the acute angle $\phi$, as well as values of the aforementioned dimensions A, B, C and D discussed earlier herein in connection with FIG. 5, for various combinations of cable attachment to the holes of the corresponding plate numbers for the first and second cable means. As mentioned,

TABLE I

DIMENSIONS OF THE SCRAPER BLADE ORIENTATIONS FOR VARIOUS CABLE ATTACHMENT CONFIGURATIONS

| Adjustment Hole | | | | | | |
|---|---|---|---|---|---|---|
| First Cable Means | Second Cable Means | A | B | C | D | $\phi$ |
| 4 | 4 | 10 | 5 | 60 | 228 | 15° |
| 8 | 4 | 27 | 6 | 79 | 201 | 21° |
| 8 | 1 | 29 | 11 | 84 | 171 | 26° |
| 1 | 8 | 0 | 5 | 5 | 228 | 1° | the preferred range for the acute angle $\phi$ is 10° to 26°, so that the last cable attachment configuration in Table 1, with the first cable means connected to attachment holes 1 of structural projection number 92 and the second cable means connected to attachment holes 8 in the associated plate members of structural projection number 91, is not preferred in practice since it yields an angle $\phi$ of only 1°.

FIG. 6 also shows the details of the scraper blade 86. In practice, the scraper blade may be a flat plate type blade or alternatively it may be constructed as for example is shown in the drawing with a supporting strap member 134, to which the respective cable means are joined, and which is joined in turn to equilateral brace member 135. The actual blade elements in this structure comprise belting web numbers 136 and 137 respectively joined to the lower depending legs of equilateral brace number 135. In this manner belting web number 136 serves as the active blade element in one direction of movement of the assembly while belting web number 137 constitutes the active blade element in the reverse direction.

Figure 7:
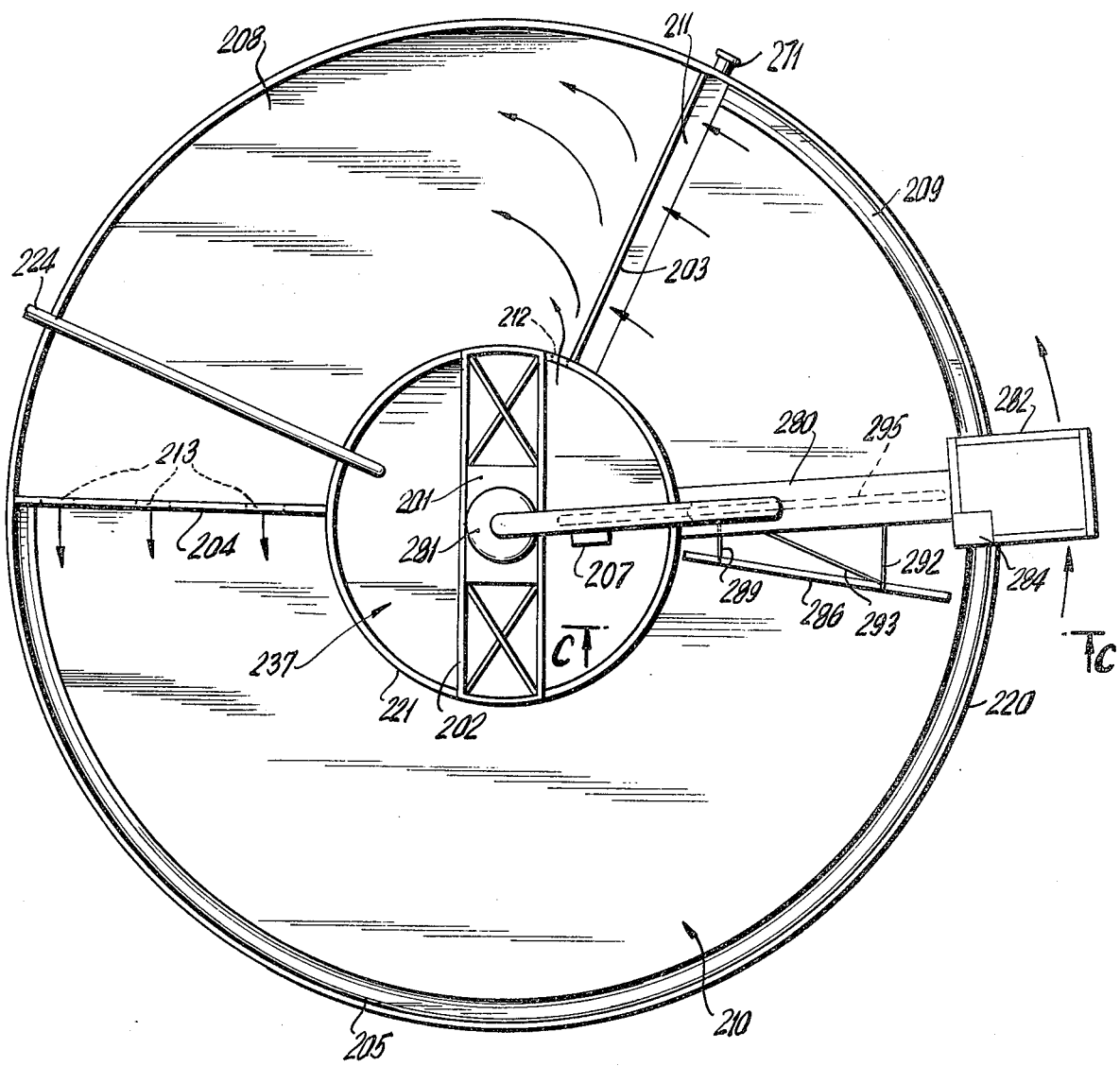
FIG. 7 is a plan view of an integral circular liquid treatment plant featuring a solids collection and removal device according to another embodiment of the invention.

FIG. 7 is a plan view of an integral circular liquid treatment plant featuring a solids collection and removal system according to another embodiment of the invention. The illustrative plant may, for example, be employed in the treatment of chemical or metallurgical pulps wherein it is desirable to chemically treat the waste liquid followed by flocculation of the liquid and final sedimentation separation of the resultant liquid-solid. The plant comprises an outer circular wall 220 and an inner circular wall 221 concentric with the outer wall forming an intermediate volume between the inner and outer walls. First radial partition 203 extends across the intermediate volume between and is joined at opposite edges to the inner and outer walls. Second radial partition 204 likewise extends across the inner and outer walls, being spaced from the first partition 203 so as to form arcuate sedimentation zone 210 in the intermediate volume bounded by segments of the inner and outer walls. The remainder of the intermediate volume not occupied by the arcuate sedimentation zone comprises flocculation chamber 208 and the inner volume of the plant within the inner circular wall 221 comprises a chemical reagent mixing and reaction zone 237.

In operation, influent waste liquid enters the plant by feed conduit 224 and is introduced into mixing and reaction zone 237 where reagent media are added by suitable means of a type well known to those in the art. During its residence time in the central zone, the dosed liquid may suitably be mixed by a mixing propeller device (not shown for clarity).

After the requisite period of reaction is completed, the dosed liquid passes out of the inner circular zone 237 through passageway 212 in the circular inner wall 221 and enters flocculation zone 208. The flocculation zone may be equipped with submerged paddle or stirrer devices if desired to assist the coagulation and flocculation in the arcuate zone 208. The dosed liquid is initially dispersed along the first radial partition 203 of the flocculation zone for circumferential flow around the full arcuate length of the zone and is discharged therefrom as feed liquid-solid to the arcuate sedimentation zone 210 by the passage openings 213 in second radial partition 204. In this manner the feed liquid-solid is distributed in the arcuate sedimentation zone 203 along the second radial partition 204 for flow circumferentially around the arcuate sedimentation zone to form a solids-depleted liquid in the upper part of the zone and a layer of settled solids in the bottom part thereof. Effluent solids-depleted liquid is discharged from the sedimentation zone at the overflow effluent trough 211 positioned at the upper portion of the first radial partition 203 and passes out of the plant in effluent conduit 271 joined to the effluent trough 211.

In this embodiment, solids collection trough 209 extends around the outer wall segment of the arcuate sedimentation zone 210 at the bottom thereof. Bridge 280 extends radially across and above the sedimentation zone and mechanical drive means 281 positioned on base 210 on platform 202 move the bridge in an arcuate path reciprocatingly and repetitively around the arcuate sedimentation zone between the first and second radial partitions 203 and 204 respectively. Scraper blade 286 extends transversely across the sedimentation zone near the bottom thereof with its outer end adjacent solids collection trough 209. First cable means 289 join an inner part of the bridge 280 and an inner part of scraper blade 286 and second cable means 292 join an outer part of the bridge and an outer part of the scraper blade, for drawing the scraper blade in an arcuate path around the arcuate sedimentation zone in trailing relationship to the points of attachment of the first and second cable means to the bridge. The second cable means 292 in this arrangement are longer in length than the first cable means 289 such that scraper blade 286 is disposed at an acute angle with respect to the radially extending bridge during movement of the bridge around the sedimentation zone. In this manner, the solids settled in the bottom part of the sedimentation zone are collected and transferred by the scraper blade to the solids collection trough 209 during the drawing of the blade around the sedimentation zone in both directions of movement. Third cable means 293 join an outer part of the scraper blade with an inner part of the bridge 280, to restrict transverse movement of the scraper blade during movement of the bridge around the sedimentation zone.

The bridge 280 is supported on the outer wall segment of the plant by means of wheel assembly 284 mounted in structural frame 282 whereby a wheel of the assembly is engaged in track 220 disposed on the upper part of the outer wall arcuate segment in the manner previously described. The bridge also has solids withdrawal conduit 295 and associated pump means 207 mounted thereon to withdraw collected solids from the solids collection trough 209 as described more fully hereinafter.

Figure 8:
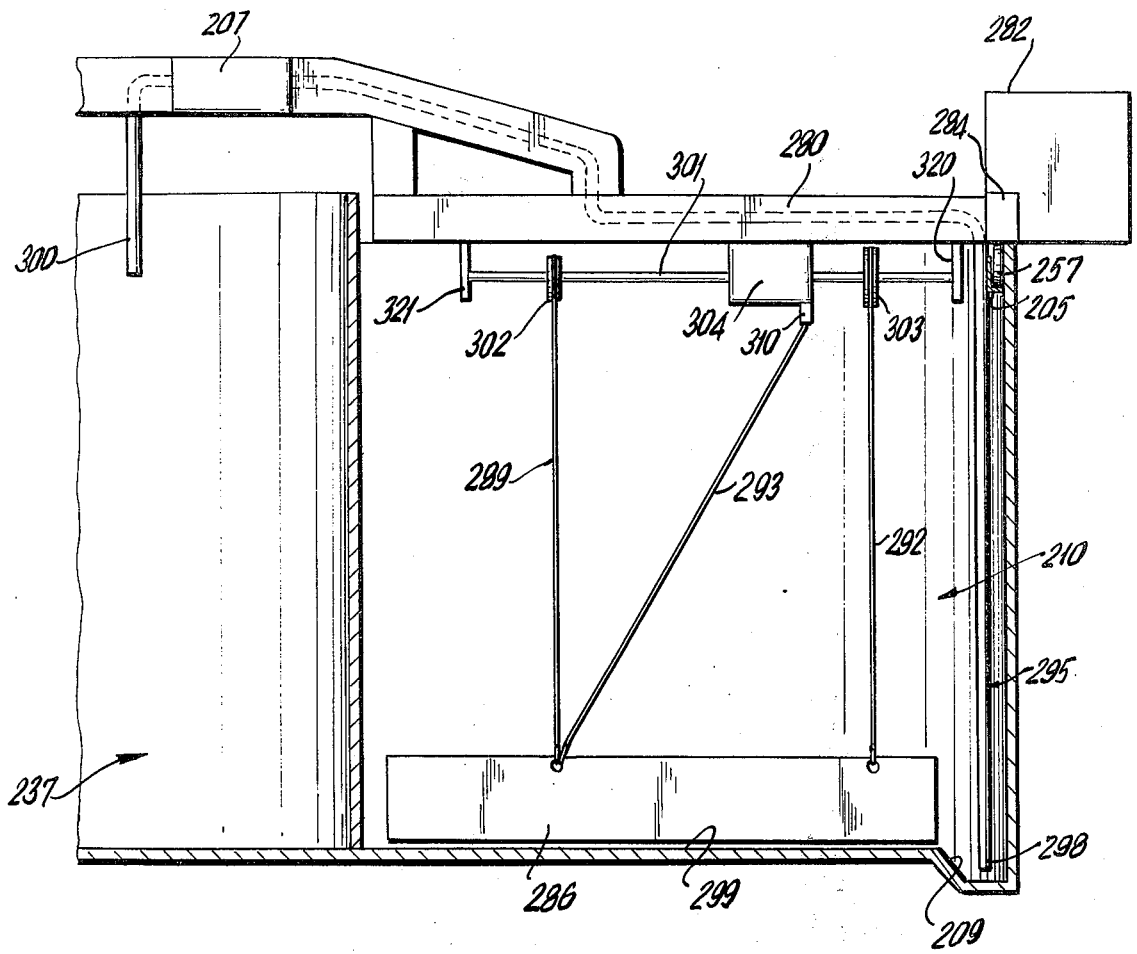
FIG. 8 is an elevation view of the FIG. 7 plant taken in cross-section along line C—C showing the structural details of the solids collection and removal device.

FIG. 8 is an elevation view of the FIG. 7 plant taken in cross-section along line C—C showing the structural details of the solids collection and removal apparatus. As shown in the drawing, the wheel assembly 284 includes wheel 257 engaging wheel track 205 attached to the outer wall segment. The scraper blade 286 is positioned proximate the bottom floor of the arcuate sedimentation zone 210 and moves the settled solids into trough 209, from which solids are withdrawn by sludge withdrawal conduit 295 having a lower end 298 positioned in the sludge trough. The withdrawal conduit 295 as shown passes through bridge structure 280 and pump means 207 mounted thereon and terminates at its opposite end 300 in the central mixing and reaction zone 237 for recirculation of the withdrawn solids thereto. Alternatively, the end 300 of the sludge withdrawal conduit may be joined with other conduit means (not shown) to discharge the withdrawn solids from the plant to disposal and/or other end use facilities.

In the FIGS. 7–8 embodiment of the invention, the means for shortening the suspended lengths of the first and second cable means at the approach of the bridge to the radial partition whereby the scraper blade is drawn toward the radial partition for radial alignment therewith, and for increasing the suspended lengths of the first and second cable means after the radial alignment upon reciprocal movement of the bridge toward the other radial partition comprise a reversible electric motor assembly 304 operatively connected with a rotatable shaft 301 mounted on the bridge by means of flange extension numbers 320 and 321 and extending longitudinally along the bridge from the inner part to the outer part thereof. Shaft 301 has first pulley means 302 fixedly mounted thereon at its inner part and connected to the first cable means 289 and second pulley means 303 fixedly mounted thereon at its outer part and connected to the second cable means. The third cable means 293 is connected to the bridge by means of flange projection 310 attached to the housing of the motor assembly. Internal timer means are provided in motor assembly 304 for actuating the electric motor at the approach of the bridge 280 to each radial partition to cause the first and second cable means to be wound onto the respective pulley means 302 and 303 to a predetermined extent for the aforementioned shortening thereof. Hence, as the bridge and scraper assembly approached the end wall, the motor will engage and begin turning shaft 301. The pulleys 302 and 303 are preferably of different diameters with pulley 303 of larger diameter than pulley 302, and will, therefore, wind up their respective connected cable means at different rates, with the longer second cable means 292 being taken up at a faster rate than the first cable means 289. The size of the pulleys 302 and 303 and the rotational speed of the motor are synchronized with the movement of the scraper bridge so that as the assembly reaches the end wall, the suspended lengths of the cable means are shortened to cause the scraper blade 286 to be swung toward the radial partition end wall for radial alignment therewith. After the radial alignment upon reciprocal movement of the bridge toward the other radial partition, the electric motor is reversingly actuated by means in the assembly 304 to cause the first and second cable means to be unwound from the respective pulley means 302 and 303 to a predetermined extent for the aforementioned increasing of the suspended lengths thereof. Thus, when the bridge reverses its direction, the motor will permit the cables to unwind and the scraper blade will assume the correct attitude for sludge removal in the new direction. In this way, dead space and solids accumulation near the end walls is effectively eliminated.

It will be recognized that the overflow effluent trough 211 in the FIGS. 7–8 system must be designed with sufficiently narrow width so as not to interfere with the proper operation of the first and second cable means in the region of the first radial partition 203. Thus, in some instances, it may be necessary or desirable to deploy the effluent trough around the outer wall segment of the arcuate sedimentation zone in the manner of the FIG. 1 system.

The invention as just described possesses many advantages over prior art schemes. The overall design is extremely simple. As a result, the device is easy to operate and exhibits superior reliability requiring very low maintenance. Furthermore, because of its relatively lightweight design, the sludge collection and removal means of the instant invention can operate with a lower horsepower requirement and lower torque than corresponding prior art designs.

Although preferred embodiments have been described in detail, it will be further appreciated that other embodiments are contemplated only with modification of the disclosed features, as being within the scope of the invention.

What is claimed:

1. In a liquid treatment apparatus comprising a circular tank outer wall; a circular inner wall concentric with said outer wall forming an intermediate volume between said inner and outer walls; a first radial partition extending across said intermediate volume between and joined at opposite edges to said inner and outer walls; a second radial partition extending across said intermediate volume and joined at opposite edges to said inner and outer walls, being spaced from said first radial partition to as to form arcuate sedimentation zone in said intermediate volume bounded by segments of said inner and outer walls; means for introducing and distributing feed liquid - solid in said arcuate sedimentation zone for sedimentation therein to form a solids-depleted liquid in the upper part of said zone and a layer of settled solids in the bottom part thereof; means for discharging solids-depleted liquid from said upper part of said sedimentation zone; the improvement of means for collecting and removing settled solids from said bottom part of said sedimentation zone comprising: a solids collection trough extending around one of said inner and outer wall segments at the bottom of said sedimentation zone; a bridge extending radially across and above said sedimentation zone; mechanical drive means for moving said bridge in an arcuate path reciprocatingly and repetitively around said arcuate sedimentation zone between said first and second radial partitions; a scraper blade extending transversely across said sedimentation zone at the bottom thereof and having one end adjacent said solids collection trough; first cable means joining an inner part of said bridge and an inner part of said scraper blade and second cable means joining an outer part of said bridge and an outer part of said scraper blade, for drawing said scraper blade in an arcuate path around said arcuate sedimentation zone in trailing relationship to the points of attachment of said first and second cable means to said bridge, said cable means nearer said solids collection trough being longer in length than the other said cable means such that said scraper blade is disposed at an acute angle with respect to said radialy extending bridge during movement of said bridge around said sedimentation zone, whereby said solids settled in the bottom part of said sedimentation zone are collected and transferred by said blade to said solids collection trough during said drawing of said blade around said sedimentation zone in both directions of movement; third cable means joining one of said inner and outer parts of said scraper blade with an opposite part of said bridge, to restrict transverse movement of said scraper blade during movement of said bridge around said sedimentation zone; means for shortening the suspended lengths of said first and second cable means at the approach of said bridge to each said radial partition, whereby said scraper blade is drawn toward said radial partition for radial alignment therewith, and for increasing the suspended lengths of said first and second cable means after said radial alignment upon reciprocal movement of said bridge toward the other radial partition, so as to eliminate solids accumulation adjacent said radial partitions; and means for withdrawal of collected solids from said solids collection trough.

2. Apparatus according to claim 1 wherein said solids collection trough extends around said inner wall segment of said sedimentation zone.

3. Apparatus according to claim 1 wherein the length of said scraper blade is substantially equal to the radial distance from said solids collection trough to the opposite circular wall segment of said arcuate sedimentation zone.

4. Apparatus according to claim 1 wherein said means for withdrawal of collected solids from said solids collection trough comprise a conduit mounted to said bridge and having a lower end positioned in said solids collection trough and an upper end disposed in flow communication with sludge receptable means, and pump means mounted on said bridge and joined to said conduit for moving withdrawn solids therethrough.

5. Apparatus according to claim 1 wherein said means for introducing and distributing feed liquid-solid in said arcuate sedimentation zone uniformly distribute said feed liquid-solid around said inner wall segment for radial flow across said arcuate sedimentation zone and said means for discharging solids-depleted liquid from said upper part of said sedimentation zone comprise trough means around the upper part of said outer wall segment of said arcuate sedimentation zone.

6. Apparatus according to claim 1 wherein said means for shortening the suspended lengths of said first and second cable means at the approach of said bridge to each said radial partition, and for increasing the suspended lengths of said first and second cable means after said radial alignment upon reciprocal movement of said bridge toward the other radial partition comprise reversible electric motor means operatively connected with a rotatable shaft mounted on said bridge and extending longitudinally along said bridge from said inner part to said outer part thereof, said shaft having first pulley means fixedly mounted thereon to its inner part and connected to said first cable means and second pulley means fixedly mounted thereon at its outer part and connected to said second cable means, with means for actuating said electric motor means at the approach of said bridge to a said radial partition to cause said first and second cable means to be wound onto the respective said pulley means to a predetermined extent for said shortening thereof and for reversingly actuating said electric motor means after said radial alignment upon reciprocal movement of said bridge toward the other said radial partition to cause said first and second cable means to be unwound from the respective said pulley means to a predetermined extent for said increasing the suspended lengths thereof.

7. Apparatus according to claim 1 wherein said means for shortening the suspended lengths of said first and second cable means at the approach of said bridge to each said radial partition and for increasing the suspended lengths of said first and second cable means after said radial alignment upon reciprocal movement of said bridge toward the other radial partition comprise structural projection members joined to said bridge at the respective inner and outer parts thereof, extending transversely outwardly from said bridge at both sides thereof at an elevation above the upper ends of said radial partitions, with said cable means comprising cables joined to the outer portions of said structural projection members at one end and joined to said scraper blade at the opposite ends, and with rotatable roller means mounted on the upper ends of said radial partitions at inner and outer parts thereof and arranged for contact with said cables joined to the adjacent one side of the said bridge upon said approach of said bridge to a said radial partition, whereby the adjacent cable of the cable means nearer the solids collection trough initially engages the correspondingly positioned roller upon said approach and is slidingly translated thereacross such that the suspended length of the engaged adjacent cable is shortened and thereafter the adjacent cable of the other cable means engages the correspondingly positioned other roller and is slidingly translated thereacross to shorten the suspended length of the other adjacent cable, for said radial alignment with said radial partition, with the cables joined to the structural projection members on the other side of said bridge farther from said radial partition thereafter serving to draw said scraper blade in the reverse direction whereby the suspended lengths of said first and second cable means are increased after said radial alignment upon reciprocal movement of said bridge toward the other radial partition.

8. Apparatus according to claim 2 wherein said means for shortening the suspended lengths of said first and second cable means at the approach of said bridge to each said radial partition and for increasing the suspensed lengths of said first and second cable means after said radial alignment upon reciprocal movement of said bridge toward the other radial partition comprise structural projection members joined to said bridge at the respective inner and outer parts thereof, extending transversely outwardly from said bridge at both sides thereof at an elevation above the upper ends of said radial partitions, with said cable means comprising cables joined to the outer portions of said structural projection members at one end and joined to said scraper blade at the opposite ends, and with rotatable roller means mounted on the upper ends of said radial partitions at inner and outer parts thereof and arranged for contact with said cables joined to the adjacent one side of the said bridge upon said approach of said bridge to a said radial partition, whereby the inner adjacent cable of said first cable means initally engages said inner roller upon said approach and is slidingly translated thereacross such that the suspended length of said inner adjacent cable is shortened and thereafter the outer adjacent cable of said second cable means engages said outer roller and is slidingly translated thereacross to shorten the suspended length of said outer adjacent cable, for said radial alignment with said radial partition, with the cables joined to the structural projection members on the other side of said bridge farther from said radial partition thereafter serving to draw said scraper blade in the reverse direction whereby the suspended lengths of said first and second cable means are increased after said radial alignment upon reciprocal movement of said bridge toward the other radial partition.

9. Apparatus according to claim 1 wherein said liquid treatment apparatus comprises at least two covered enclosed aeration zones within said circular outer wall.

10. Apparatus according to claim 9 wherein the ratio of the inner circular wall radius ($R_1$) to the outer circular wall radius ($R_2$) is between 0.25 and 0.70 and said second radial partition is spaced from said first radial partition such that said arcuate sedimentation zone is bounded by segments of said inner and outer walls comprising between 90° and 330° of their respective circumferences.

11. Apparatus according to claim 9 wherein said inner volume within said circular inner wall comprises a final aeration zone.

12. Apparatus according to claim 2 wherein said bottom part of said arcuate sedimentation zone slopes from said outer circular wall radially downwardly toward said solids collection trough.

13. In a wastewater treatment apparatus comprising a circular tank outer wall; a circular inner wall concentric with and spaced from said outer wall forming an inner volume and intermediate volume between said inner and outer walls, such that the ratio of the inner wall radius ($R_1$) to the outer wall radius ($R_2$) is between 0.25 and 0.70; a first radial partition extending across said intermediate volume between and joined at opposite edges to said inner and outer walls; a second radial partition extending across said intermediate volume between and joined at opposite edges to said inner and outer walls, being spaced from said first radial partition so as to form a first arcuate portion sedimentation zone in said intermediate volume bounded by segments of said inner and outer walls comprising between 90° and 330° of their respective circumferences and a second arcuate portion comprising the remainder of said intermediate volume; first fluid mixing and recirculation means within said outer wall in a first part other than said first arcuate portion and a cover enclosing said first part positioned over said first fluid mixing and recirculation means to form a first aeration zone; first passage means for introducing oxygen gas in said first aeration zone; second passage means for introducing feed wastewater and thickened activated sludge to said first aeration zone; second fluid mixing and recirculation means within said outer wall in a second part other than said first arcuate portion and a second cover enclosing said second part positioned over said second fluid mixing and recirculation means to form a second aeration zone; first gas interzone transfer means spaced from said first passage means for discharging oxygen-depleted gas from said first aeration zone and introducing same to said second aeration zone as the oxygen-containing gas therefor; first liquor interzone transfer means for discharging first oxygenated liquor from said first aeration zone and introducing same to said second aeration zone for mixing therein with said oxygen-containing gas; gas vent means spaced from said first gas interzone transfer means for discharging oxygen-further depleted gas from said second aeration zone; liquor passage means for discharging second oxygenated liquor from said second aeration zone; means for uniformly distributing oxygenated liquor in said first arcuate portion sedimentation zone in said intermediate volume around the inner wall segment for radial flow across said first arcuate portion sedimentation zone for both clarification of said liquor and thickening of activated sludge therein; trough means around the upper part of said outer wall segment of said first arcuate portion sedimentation zone for discharging clarified water therefrom; the improvement of means for collecting and removing settled thickened activated sludge from the bottom part of said first arcuate portion sedimentation zone comprising: a sludge collection trough extending around said inner wall segment at the bottom of said sedimentation zone; a bridge extending radially across and above said sedimentation zone; mechanical drive means for moving said bridge in an arcuate path reciprocatingly and repetitively around said arcuate sedimentation zone between said first and second radial partitions; a scraper blade extending transversely across said sedimentation zone at the bottom thereof and having one end adjacent said sludge collection trough; first cable means joining an inner part of said bridge and an inner part of said scraper blade and second cable means joining an outer part of said bridge and an outer part of said scraper blade, for drawing said scraper blade in an arcuate path around said arcuate sedimentation zone in trailing relationship to the points of attachment of said first and second cable means to said bridge, said first cable means being longer in length than said second cable means such that said scraper blade is disposed at an acute angle with respect to said radially extending bridge during movement of said bridge around said sedimentation zone, whereby said sludge solids settled in the bottom part of said sedimentation zone are collected and transferred by said blade to said sludge collection trough during said drawing of said blade around said sedimentation zone in both directions of movement; third cable means joining said part of said scraper blade nearer said sludge collection trough with an opposite part of said bridge, to restrict transverse movement of said scraper blade during movement of said bridge around said sedimentation zone; means for shortening the suspended lengths of said first and second cable means at the approach of said bridge to each said radial partition, whereby said scraper blade is drawn toward said radial partition for radial alignment therewith, and for increasing the suspended lengths of said first and second cable means after said radial alignment upon reciprocal movement of said bridge toward the other radial partition, so as to eliminate sludge solids accumulation adjacent said radial partitions; and means for withdrawal of collected sludge solids from said sludge collection trough.

14. In a wastewater treatment apparatus comprising a circular tank outer wall; a circular inner wall concentric with and spaced from said outer wall forming an inner volume and intermediate volume between said inner and outer walls, such that the ratio of the inner wall radius ($R_1$) to the outer wall radius ($R_2$) is between 0.25 and 0.70; a first radial partition extending across said intermediate volume between and joined at opposite edges to said inner and outer walls; a second radial partition extending across said intermediate volume between and joined at opposite edges to said inner and outer walls, being spaced from said first radial partition so as to form a first arcuate portion sedimentation zone in said intermediate volume bounded by segments of said inner and outer walls comprising between 90° ad 330° of their respective circumferences, and a second arcuate portion comprising the remainder of said intermediate volume; first fluid mixing and recirculation means within said outer wall in a first part other than said first arcuate portion and a cover enclosing said first part positioned over said first fluid mixing and recirculation means to form a first aeration zone; first passage means for introducing oxygen gas in said first aeration zone; second passage means for introducing feed wastewater and thickened activated sludge to said first aeration zone; second fluid mixing and recirculation means within said outer wall in a second part other than said first arcuate portion and a second cover enclosing said second part positioned over said second fluid mixing and recirculation means to form a second aeration zone; first gas interzone transfer means spaced from said first passage means for discharging oxygen-depleted gas from said first aeration zone and introducing same to said second aeration zone as the oxygen-containing gas therefor; first liquor interzone transfer means for discharging first oxygenated liquor from said first aeration zone and introducing same to said second aeration zone for mixing therein with said oxygen-containing gas; gas vent means spaced from said first gas interzone transfer means for discharging oxygen-further depleted gas from said second aeration zone; liquor passage means for discharging second oxygenated liquor from said second aeration zone; means for uniformly distributing oxygenated liquor in said first arcuate portion sedimentation zone in said intermediate volume around the inner wall segment for radial flow across said first arcuate portion sedimentation zone for both clarification of said liquor and thickening of activated sludge therein; trough means around the upper part of said outer wall segment of said first arcuate portion sedimentation zone for discharging clarified water therefrom; the improvement of means for collecting and removing settled thickened activated sludge from the bottom part of said first arcuate portion sedimentation zone comprising: a sludge collection trough extending around said inner wall segment at the bottom of said sedimentation zone; a bridge extending radially across and above said sedimentation zone, with structural projection members joined to said bridge at the respective inner and outer parts thereof, extending transversely outwardly from said bridge at both sides thereof at an elevation above the upper ends of said radial partitions; mechanical drive means for moving said bridge in an arcuate path reciprocatingly and repetitively around said arcuate sedimentation zone between said first and second radial partitions; a scraper blade extending transversely across said sedimentation zone near the bottom thereof and having its inner end adjacent said sludge collection trough; first cable means comprising cables joined at one end to the outer portions of said structural projection members at the inner part of said bridge and joined to an inner part of said scraper blade at the opposite ends and second cable means comprising cables joined at one end to the outer portions of said structural projection members at the outer part of said bridge and joined to an outer part of said scraper blade at the opposite ends, said first cable means being longer in length than the other said cable means such that said scraper blade is disposed at an acute angle with respect to said radially extending bridge during movement of said bridge around said sedimentation zone, whereby said sludge solids settled in the bottom part of said sedimentation zone are collected and transferred by said blade to said sludge collection trough during said drawing of said blade around said sedimentation zone in both directions of movement; third cable means joining said part of said scraper blade nearer said sludge collection trough with an opposite part of said bridge, to restrict transverse movement of said scraper blade during movement of said bridge around said sedimentation zone; rotatable roller means mounted on the upper ends of said radial partitions at inner and outer parts thereof and arranged for contact with said cables joined to the adjacent one side of the said bridge upon said approach of said bridge to a said radial partition, whereby the inner adjacent cable of said first cable means initially engages said inner roller at the approach of said bridge to each said radial partition and is slidingly translated across said inner roller such that the suspended length of said inner adjacent cable is shortened and thereafter the adjacent outer cable of said second cable means engages said outer roller and is slidably translated thereacross to shorten the suspended length of said outer adjacent cable, whereby said scraper blade is drawn toward said radial partition for radial alignment therewith, with the cables joined to the structural projection members on the other side of said bridge farther from said radial partition thereafter serving to draw said scraper blade in the reverse direction whereby the suspended lengths of said first and second cable means are increased after said radial alignment upon reciprocal movement of said bridge toward the other radial partition, so as to eliminate sludge solids accumulation adjacent said radial partitions; and means for withdrawal of collected sludge solids from said sludge collection trough.

15. Apparatus according to claim 1 wherein said acute angle formed by said scraper blade with respect to said radially extending bridge is in the range of 10° to 26°.

16. Apparatus according to claim 2 wherein said third cable means join said part of said scraper blade nearer said solids collection trough with an opposite part of said bridge.

* * * * *

UNITED STATES PATENT OFFICE
CERTIFICATE OF CORRECTION

Patent No. 3,977,974                Issue Date August 31, 1976

Inventor(s) J. F. Pelton

It is certified that error appears in the above-identified patent and that said Letters Patent are hereby corrected as shown below:

Column 22, line 32, after "thereon", delete "to" and substitute -- at -- therefor.

Signed and Sealed this

Twenty-ninth Day of March 1977

[SEAL]

Attest:

RUTH C. MASON
Attesting Officer

C. MARSHALL DANN
Commissioner of Patents and Trademarks